US012039626B2

(12) United States Patent
Glen (10) Patent No.: US 12,039,626 B2
(45) Date of Patent: Jul. 16, 2024

(54) METHOD AND APPARATUS FOR CONTROLLING IMAGE PROCESSING PIPELINE CONFIGURATION DATA DURING DEMONSTRATION AND NON-DEMONSTRATION MODES

(71) Applicant: ATI Technologies ULC, Markham (CA)

(72) Inventor: David I. J. Glen, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 27 days.

(21) Appl. No.: 17/555,955

(22) Filed: Dec. 20, 2021

(65) Prior Publication Data

US 2023/0196496 A1 Jun. 22, 2023

(51) Int. Cl.
*G06T 1/20* (2006.01)
*G06F 3/14* (2006.01)
*G06F 3/04847* (2022.01)

(52) U.S. Cl.
CPC .................. *G06T 1/20* (2013.01); *G06F 3/14* (2013.01); *G06F 3/04847* (2013.01)

(58) Field of Classification Search
None
See application file for complete search history.

(56) References Cited

U.S. PATENT DOCUMENTS

| 8,669,993 | B2* | 3/2014 | Bratt | G06F 3/14 |
| | | | | 345/545 |
| 2010/0302264 | A1* | 12/2010 | Segawa | G06T 3/00 |
| | | | | 345/530 |
| 2015/0116468 | A1* | 4/2015 | Au | G09G 5/397 |
| | | | | 348/54 |
| 2019/0295210 | A1* | 9/2019 | Pei | G09G 5/14 |
| 2020/0064902 | A1* | 2/2020 | Holland | G06T 1/60 |
| 2022/0343878 | A1* | 10/2022 | Menachem | G09G 5/006 |
| 2023/0040998 | A1* | 2/2023 | Xu | G06T 1/20 |

* cited by examiner

*Primary Examiner* — Patrick F Valdez (57) ABSTRACT

An image generation apparatus includes at least a first configuration register that includes first configuration data for configuring parameters of an image processor, at least a second configuration register that includes second configuration data for configuring the parameters of a same image processing pipeline in the image processor, multiplexing logic coupled to the first configuration register and to the second configuration register, control logic that controls the multiplexing logic to in a non-demonstration mode select one of the first or second configuration registers to produce a first image frame and operative in a demonstration mode to provide both the first and second configuration data for the same image processing pipeline of the image processor to use for generating different regions of an image frame.

20 Claims, 6 Drawing Sheets

FIG. 5 (FOR FIG. 3 OPERATION)

METHOD AND APPARATUS FOR CONTROLLING IMAGE PROCESSING PIPELINE CONFIGURATION DATA DURING DEMONSTRATION AND NON-DEMONSTRATION MODES

BACKGROUND OF THE DISCLOSURE

Demonstration (demo) modes are useful to show different image processing options to a user in two parts of a display screen at the same time using multiple image processing pipelines, one for each part of the display screen. Demonstration modes of operation are sometimes used to allow a user to change image processor configuration settings to see how different settings change displayed image frames to show new features and/or to show before/after demonstration of user controllable parameter settings. User programmable setting are sometimes set through a graphics user interface within a settings application or operating system on a computing device such as on a laptop computer, desktop computer, tablet, handheld device or other computing device.

In some systems, multiple pipeline support for demo modes typically requires output of image frames from each pipeline to a display. Adding hardware support, such as an additional image processing pipeline for demo modes is challenging due to added die area cost needed for integrated circuits that include an image processor such as graphics processing unit (GPU), central processing unit (CPU), a dedicated image processor or other logic that performs image processing operations. Adding image processing pipeline hardware, to an image processor or adding an image processor for the demo mode also results in added development efforts for limited business return.

Some hardware blocks, such as those for an image processing pipeline in image processors include double buffering of image pipeline configuration data that during normal operation configures an image processor to perform image processing and display operations. In some systems, double buffered configuration data includes pipeline configuration data such as from control registers, 1D or 3D look-up-tables from registers, coefficients from registers, to allow programming of an "on base" (also referred to as a pending configuration) configuration while still actively using an "at bat" configuration (also referred to as the active configuration) during a non-demonstration mode of operation. The purpose of a pending (on base) configuration is to enable fast context switch between image frames, as a driver can use the processing time of a current frame to configure the setup of the next image frame. Fast frame-to-frame transition is then possible without a need to idle the processing pipe for a long time to setup next frame configuration. In other systems, for non-demonstration mode operation, an image processing pipeline may include additional configuration registers used only for additional regions within an image frame.

Demo modes can sometimes be added by leveraging spare hardware (HW) resources such as extra display pipelines, but this does not work in cases where all HW resources are already consumed by the base use case. For example, driving a 4K, 60 Hz display may use only one display pipe, but driving an 8K, 120 Hz display may consume all 4 display pipes in a GPU that employs 4 display pipes. So a demo mode using spare pipes could not be leveraged on an 8K, 120 HZ display.

Often demo modes are done instead by using two display screens and two image processing pipelines, one for each display, but this is not as easy to see the difference, and needs multiple displays to show the demo. Also, demo modes can be built natively into rendering applications by having them render different parts of the frame with different settings, but this needs the application to natively build in this support.

Demo modes for image processing provided by a GPU driver control (e.g., CPU executing driver code) or hardware (display engine, ISP, video processor, etc.) are also challenging as the operating system (OS) and application do not provide the opportunity to process areas of the frames differently. Sometimes this can be done with special driver coding and leveraging unused display pipelines (for example), but that is complicated driver work, and it fails in scenarios where all hardware resources are already consumed (e.g. driving an 8K, 120 Hz display already consumes all display pipelines, so there is no way to add demo mode as there are no spare pipes).

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

In some implementations, apparatus and methods provide a demo mode that employs differing pipeline configuration data for a same image processing pipeline for differing regions of a same image frame from multiple configuration registers. In one example, both the at bat and on base configurations are used by a same processing pipeline for different areas of the same image frame for a demo mode. This avoids much of the added hardware needed for separate display pipes (multiple image processing pipelines) to use for a demonstration mode in prior systems and simplifies the design complexity for systems that use demo modes.

In certain examples, an image generation apparatus includes at least a first configuration register that includes first configuration data for configuring parameters of an image processor, at least a second configuration register that includes second configuration data for configuring the parameters of a same image processing pipeline in the image processor, multiplexing logic coupled to the first configuration register and to the second configuration register, control logic coupled to the multiplexing logic, that controls the multiplexing logic to in a non-demonstration mode select one of the first or second configuration registers to produce a first image frame and operative in a demonstration mode to provide both the first and second configuration data for the same image processing pipeline of the image processor to use for generating different regions of an image frame.

In certain examples, the image processor generates a first frame region of the image frame as a demonstration region based on the first configuration register and generates a second frame region of the same image frame, using the same processing pipeline. In some implementations, the second frame region is generated using the configuration data of the second configuration register, and wherein the first frame region includes pixel data that demonstrates different display parameter settings of the image processor compared to the second frame region of the image frame that is based on the second configuration register.

In some examples, the control logic defines, such as by using display screen coordinates, the first frame region of the image frame and defines a different second frame region of the image frame and controls the multiplexing logic to select the first configuration data from the first configuration register for generation of the first frame region as a demonstration region, and controls the multiplexing logic to select the second configuration data from the second configuration register for generation of the second frame region of the display screen so that the generated first frame region and the generated second frame region are displayed together in an image frame on the display screen.

In certain examples, the control logic configures the first configuration register as a pending configuration register during a non-demonstration mode and configures the second configuration register as an active configuration register during a non-demonstration mode.

In some examples, the control logic controls selection of the first configuration data based on screen location coordinates that define a demonstration area of a display screen. In certain examples, the multiplexing logic includes exclusive OR logic operatively coupled to the select the first configuration data in response to demo image region coordinate data.

In some examples, the first configuration register is configured to pass the first configuration data to the second configuration register between image frames during a non-demonstration mode, and in a demonstration mode selects configuration data from each the configuration registers for a respective pre-demo frame region and post-demo frame region of an image frame. In some implementations, the control logic enables a demonstration mode of operation, and in response to enabling the demonstration mode, sets a lock to block copying of first configuration data of the first configuration register to the second configuration register. In certain implementations, the control logic defines a post-demo frame region as the first frame region of the image frame, such as by defining a window size and location, and defines a pre-demo frame region as the second frame region of the image frame, such as by defining a demo window size and location, and configures the post-demo frame region by setting the first configuration register to produce a demo image in the post-demo frame region. In some implementations, in response to user rejection data indicating when a user rejects the demonstration settings, the control logic reprograms the first register to an initial state before the demo mode was enabled and undoes the lock. In certain implementations, in response to user acceptance data indicating when the user accepts the demonstration settings, the control logic undoes the lock to allow non-demonstration mode operation that passes first configuration register contents (the demo configuration settings) to the second configuration register.

In some implementations, an image generation apparatus includes a display that displays one or more image frames, an image processor that provides image frames for display, at least a first configuration register that includes first configuration data for configuring parameters of a processing pipeline of the image processor, at least a second configuration register that includes second configuration data for configuring the parameters of the processing pipeline, multiplexing logic coupled to the first configuration register and to the second configuration register, control logic, coupled to the multiplexing logic, that controls the multiplexing logic in a non-demonstration mode to select one of the first or second configuration registers to produce a first image frame and operative in a demonstration mode to provide both the first and second configuration data for the processing pipeline of the image processor, and wherein the image processor generates different regions of an image frame on the display based on the both the first and second configuration data.

In certain examples, the image processor generates a first frame region of the image frame as a demonstration region based on the first configuration register, and generates a second frame region of the same image frame as a second frame region based on the second configuration register, wherein the first frame region includes pixel data that demonstrates different display parameter settings of the image processor compared to the second frame region of the image frame that is based on the second configuration register.

In some examples, the control logic defines the first frame region of the image frame and defines a different second frame region of the image frame, controls the multiplexing logic to select the first configuration data from the first configuration register for generation of the first frame region as a demonstration frame region, and controls the multiplexing logic to select the second configuration data from the second configuration register for generation of the second frame region of the display screen so that the generated first frame region and the generated second frame region are displayed together in an image frame at same time in an image frame on the display screen.

In certain examples, the control logic configures the first configuration register as a pending configuration register during a non-demonstration mode and to configure the second configuration register as an active configuration register during a non-demonstration mode.

In some examples, the control logic controls selection of the first configuration data based on screen location coordinates that define a demonstration area of a display screen.

In certain examples, the multiplexing logic includes exclusive OR logic coupled to the select the first configuration data in response to demo image region coordinate data.

In some examples, the pending configuration register passes the first configuration data to the active configuration register between image frames during the non-demonstration mode and the control logic enables a demonstration mode of operation, in response to enabling the demonstration mode, sets a lock to block copying of first configuration data to the active configuration register, defines a post-demo region as the first frame region of the image frame and defines a post-demo frame region as the second frame region, sets the pending configuration register to produce a demo image in the pre-demo frame region, in response to user rejection data indicating when a user rejects demonstration settings, reprograms pending register to initial state before demo mode enabled, and in response to acceptance data indicating when the user accepts demonstration settings, releases a lock to allow non-demonstration mode operation that passes pending configuration register contents to the active configuration register.

In some implementations, a method for providing an image frame includes detecting selection of a demonstration mode to demonstrate at least one selected configuration parameter of an image processor, and controlling multiplexing logic in a non-demonstration mode to select one of the first or second configuration registers to produce a first image frame and operative in a demonstration mode to provide both first configuration data from at least a first configuration register and second configuration data from at least a second configuration register to a same image processing pipeline of the image processor to configure the image processor. The method includes generating different frame regions of an image frame wherein a first frame region is generated using the first configuration data and a second frame region is generated using the second configuration data.

In certain examples, the method includes generating the first frame region of the image frame as a demonstration region based on the first configuration register, and generating the second frame region of the same image frame as the second frame region based on the second configuration register, wherein the first frame region includes pixel data that demonstrates different display parameter settings of the image processor compared to the second frame region of the image frame that is based on the second configuration register.

In some examples, the method includes defining, such as by using display screen location coordinates, the first frame region of the image frame and defining a different second frame region of the image frame, controlling the multiplexing logic to select the first configuration data from the first configuration register for generation of the first frame region as a demonstration image region, and controlling the multiplexing logic to select the second configuration data from the second configuration register for generation of the second frame region of the display screen so that the generated first frame region and the generated second frame region are displayed together in the image frame on the display screen using the same processing pipeline.

In certain examples, the method includes controlling selection of the first configuration data based on screen location coordinates that define a demonstration area of a display screen. In some examples, the method includes using exclusive OR logic to select the first configuration data in response to demo image region coordinate data.

In certain examples, the method includes configuring the first configuration register as a pending configuration register and the second configuration register as an active configuration register in a non-demonstration mode of operation and passing the first configuration data to the second configuration register between image frames during the non-demonstration mode. In some examples the method includes enabling a demonstration mode of operation, and in response to enabling the demonstration mode, setting a lock to block copying of first configuration data to the second configuration register, such as the active configuration register, defining a post-demo region as the first frame region of the image frame and defining a pre-demo frame region as the second frame region of the image frame, configuring the post-demo frame region by setting the first configuration register to produce a demo image in the post-demo frame region, in response to user rejection data indicating when a user rejects demonstration settings, reprogramming the first register to an initial state before the demo mode was enabled and releasing the lock, and in response to user acceptance data indicating when the user accepts demonstration settings, undoing the lock to allow non-demonstration mode operation that passes first configuration register contents to the second configuration register.

Figure 1:
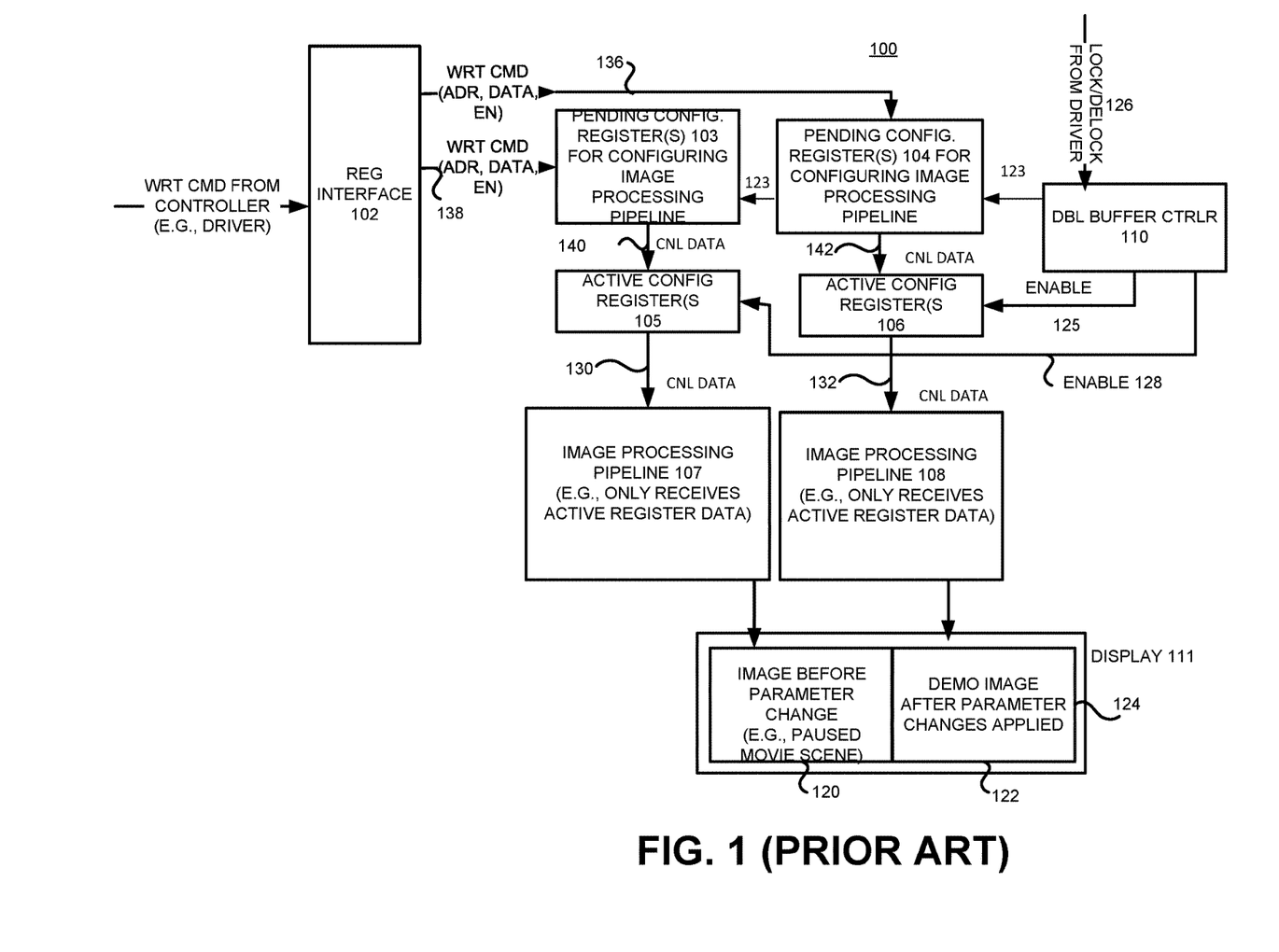
FIG. 1 is a block diagram illustrating one example of a prior art image generation apparatus.

FIG. 1 illustrates in more detail an example of a prior art display subsystem of an image processor that provides image frames for display on one or more displays. As shown, the image generation apparatus 100 includes a display subsystem that in this example provides a demonstration mode that utilizes two image processing pipelines 107 and 108 within image processors. Each of the pipelines generates a frame region 120 and 122 wherein one frame region displays an image that is set with configuration parameters pre-demonstration mode and another pipeline to generate a frame region that display pixels post demonstration that have been generated using the selected demo configuration parameters.

Each processing pipeline supports sets of active and pending registers but only an active configuration register is used to produce an image frame. In this example each image processor has respective pending configuration register 104 and active configuration register 106 such as image processing pipeline 108 whereas image processing pipeline 107 has corresponding pending configuration register 103 and active configuration register 105. The configuration data from the active configuration registers 105 and 106 are the only configuration data that each respective image processor utilizes. As such in this example multiple image processing pipelines are needed wherein each pipeline displays a portion of an image frame 124. In operation, a double buffer controller 110 enables either active configuration register 106 or active configuration register 105 through suitable enable lines 125 and 128 respectively to allow the configuration control data generally shown as 130 and 132 to configure each respective image processor. Write commands 136 and 138 are provided through a register interface 102 from a controller such as a processor (e.g., CPU) executing a driver.

In some examples, the configuration data represent functions or data representing coefficients such as gamma coefficients as known in the art or other coefficients that are used to change the image. In other examples the configuration data within the configuration registers are lookup tables, color space adjustments, dynamic range adjustments, tone mapping coefficients, 3DLUT content, sharpness controls, contrast controls, noise filter controls or other information used by the respective image processing pipelines to produce pixels for each frame region in an image frame 124.

In operation, the pending configuration registers pass their contents to the active configuration registers as shown by control data 140 and 142 under control of the double buffer controller 110 as shown by control information 123. The driver issues lock and release lock signals 126 to control the double buffer controller, as known in the art to select when the pending configuration register contents are passed to become the active configuration register contents such as when a different configuration setting is used. The driver also controls a window controller and controls which region of the display is produce by pipeline 107 versus pipeline 108.

Figure 2:
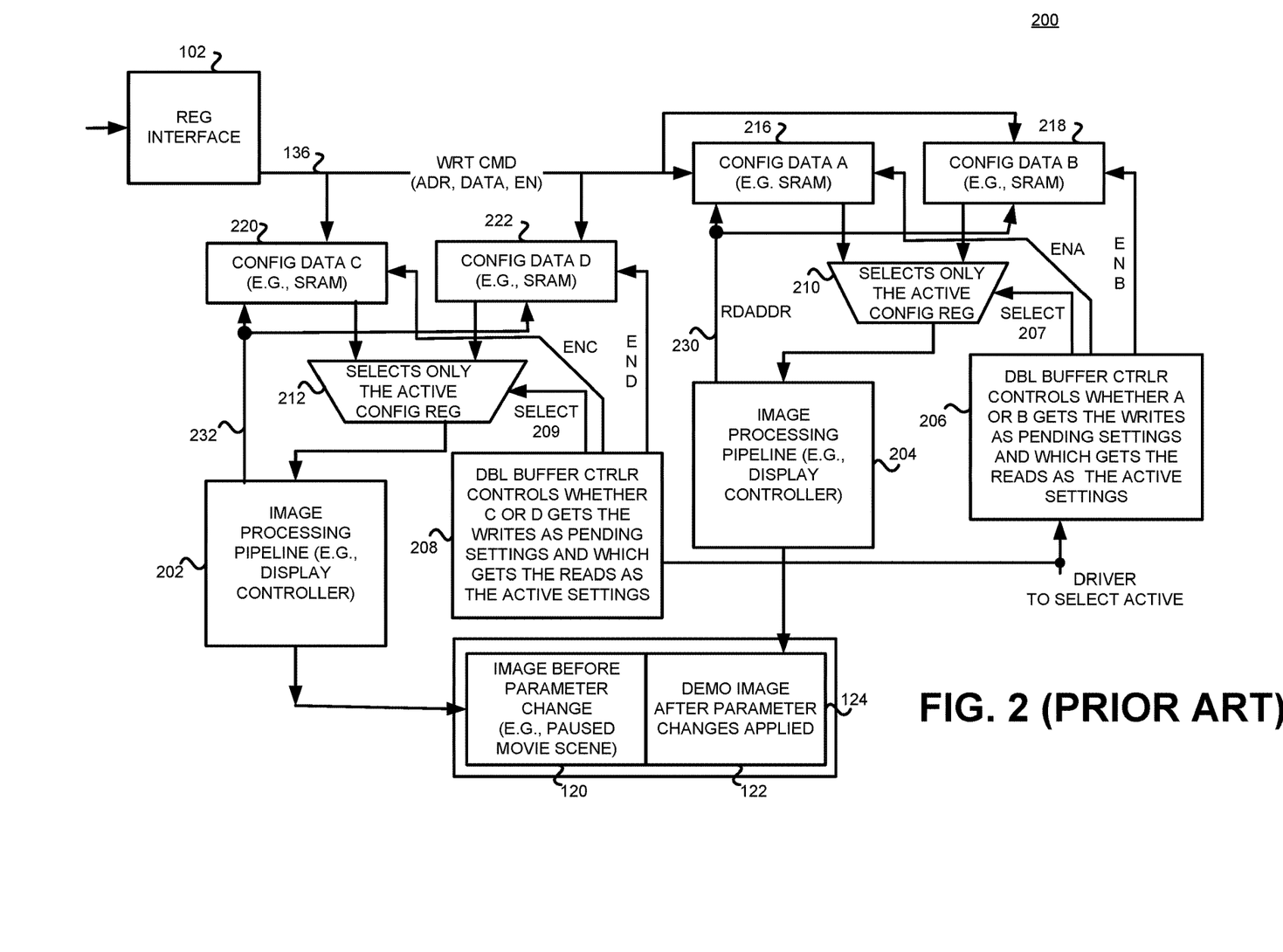
FIG. 2 is a block diagram illustrating one example of a prior art image generation apparatus.

FIG. 2 illustrates another example of a prior art image generation apparatus 200 that utilizes a display subsystem wherein the configuration registers are shown to be locations stored in memory such as SRAM and each of the configuration registers are controlled to flip between holding pending configuration data and active configuration data. In this example there are multiple display pipelines for example one in each image processing pipeline 202 and 204. As with FIG. 1 each image processing pipeline 202 and 204 and their respective image processing pipeline therein generates a portion of the image frame 124.

Each image processing pipeline 204 and 202 has a double buffer controller 206 and 208 that controls a multiplexor 210 and 212 to select, via select signals 207 and 209, from one of two differing configuration registers shown as 216, 218, 220 and 222. Either of the respective configuration registers can serve as a pending configuration register and an active configuration register and the double buffer controller 206 or 208 selects via the respective multiplexor the configuration register that is the active configuration register as known by the driver. The register interface 102 provides the write command to write the configuration data into the configuration registers, in this example into SRAM memory locations as selected by write enable A (ENa) or write enable B (ENb) and the image processor provides a read command with an address shown as 230 and 232 respectively to obtain the data from the configuration registers. As known in the art, in some implementations, SRAMs use an address to control which data to output. In this case the input image pixel data, or one color of it such as red (R), is used to generate an SRAM address (e.g. 230) that is sent to configuration registers 216 and 218. Only one of them is activated with either read enable A (ENa) or read enable B (ENb) and outputs read data. MUX 210 is set correctly to correspond to either read ENa or read ENb to pass the SRAM read data back to image processing pipeline 204. The image processing pipeline 204 then replaces or adjusts the pixel data (e.g. Red component) in response to the SRAM read data. That is for one color component of one pixel. The processes is repeated for the other color components of that pixel, and again for each pixel in the image. Similar operation occurs using read enable C (Enc) and read enable D (End) for the other configuration registers.

Each image processing pipeline for each frame region 120 and 122 are supplied with configuration data through a respective active configuration register only. As with the embodiment shown in FIG. 1, the prior art system shown requires a separate processing pipeline for each image region of the image frame 124 as well as multiple multiplexors and multiple configuration registers for each pipeline.

Figure 3:
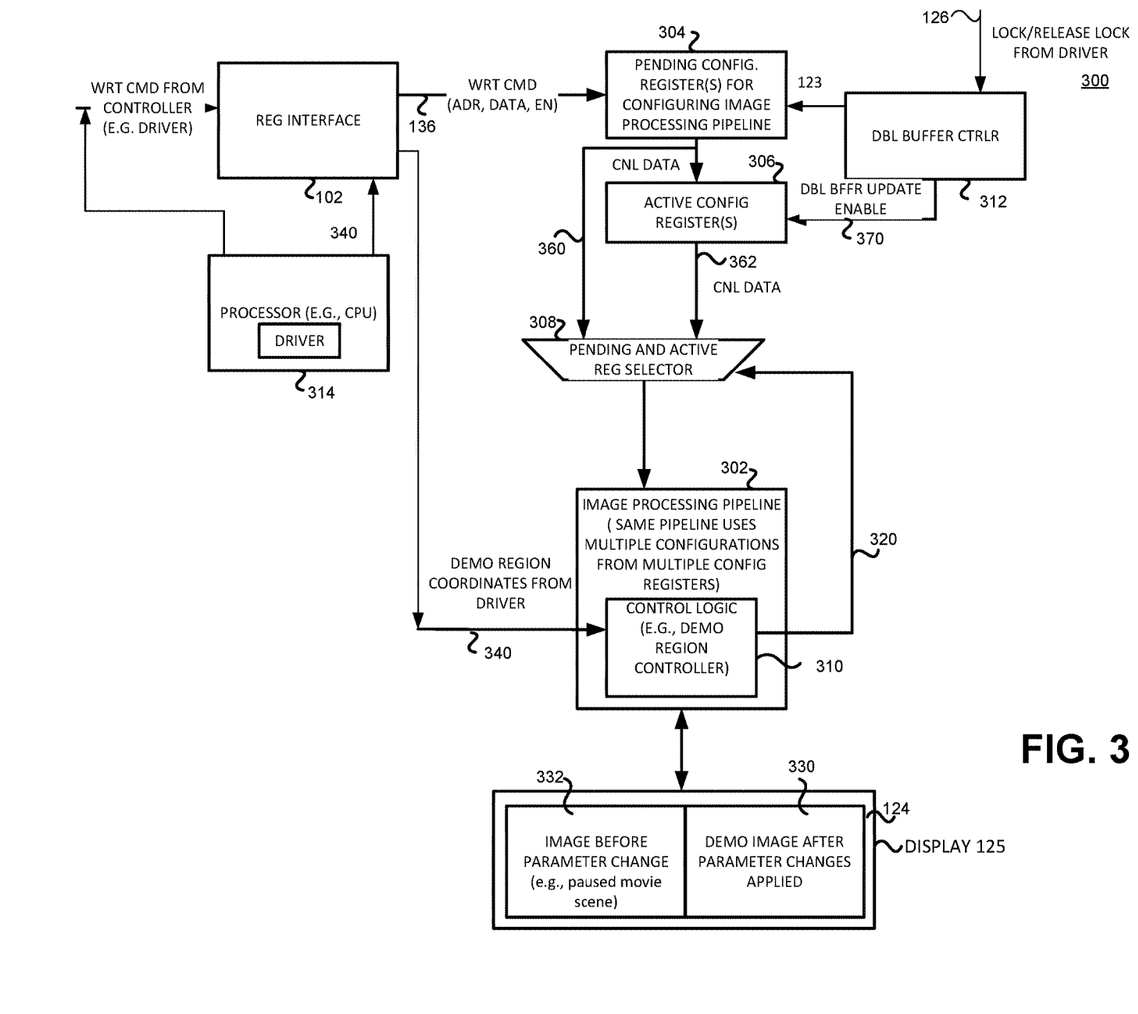
FIG. 3 is a block diagram illustrating one example of an image generation apparatus in accordance with one example set forth in the disclosure.

FIG. 3 illustrates an example of an image generation apparatus 300 that utilizes a single image processing pipeline 302 within an image processor and is supplied by both a first configuration register 304 and a second configuration register 306. During normal operation, the first configuration register 304 serves as a pending configuration register and the second configuration register is configured as the active configuration register. However, during a demonstration mode, multiplexing logic 308 selects for the same image processing pipeline 302, from a differing configuration register 304 and 306 to supply the configuration data for differing image frame regions 330 and 332 within the image frame 124.

In this example, the image generation apparatus 300 employs a first configuration register 304 that includes first configuration data for configuring parameters of the image processing pipeline 302 and the second configuration register 306 that includes configuration data for configuring the parameters of the image processing pipeline 302 for differing image frame regions of 330 and 332 of an image frame 124. Multiplexing logic 308 is coupled to select the configuration data 360, 362 from either of the configuration registers 304 and 306 and provide the configuration data on a per-frame region basis to the image processing pipeline 302 namely a same pipeline within the image processor so that the same pipeline uses multiple configurations from multiple configuration registers for a same image frame 124. Control logic 310 which in some implementations also includes double buffer controller 312 and if desired driver 314, controls the multiplexing logic 308 via control data 320 to provide both the first and second configuration data 360 and 362 for a same image processing pipeline of the image processor to use for generating different image frame regions 330 and 332 of the image frame 124. In some implementations the control logic 310 determines whether pixel information to be generated by the pipeline are for a screen location inside or outside the demonstration image frame region 330. This can be done a pixel by pixel basis, partial scan line basis, block by block basis or other suitable basis.

In some implementations, the image processing pipeline 302 generates an image frame region 330 as a demonstration region which shows the image after selected configuration parameters have been applied and also generates a second frame region 332 that shows an image before new configuration settings have been applied. In this example, the second frame region 332 is generated using the configuration data from the second configuration register 306 and the first frame region 330 includes the portion of the image frame that is based on the configuration data 360 of the first configuration register 304. In this example, the image frame region 330 includes pixel data that demonstrates different display parameter settings of the image processing pipeline 302 compared to those used to generate pixels for the frame region 332. In this example, the image in the frame region 332 is an image produced with configuration settings that existed prior to the demonstration configuration settings having been selected by a user for example. In this example the user may for example pause a graphics game or movie and wish to apply different configuration settings to see how that image would look differently with different settings which are then shown in as the demo image as image frame region 330 after the parameter changes have been applied. In other implementations no pause is used and live motion is allowed to that motion occurs during the demonstration mode to best set adjustments. Any other suitable demonstration methodologies may also be employed.

It will be recognized that the image processing pipeline can be any suitable image processing pipeline as known in the art. For example, the image processing pipeline in some implementations is a display pipeline of a graphics processing unit. In other implementations the processing pipeline is a camera or image sensor processor pipeline (ISP). It will be recognized that any other suitable image processing pipeline that generates pixels for display on a display may be employed. In some implementations, the configuration data stored in the configuration registers include data to change a color space, provide different denoise coefficients, pixel edge enhancement control data, image resizing control data or other suitable image processing pipeline configuration data as known in the art.

In this example, the image processing pipeline 302 includes a demonstration region controller 310 that selects an image area to display a demonstration image as part of the demonstration operation. For example, when the image generation apparatus is in a demonstration mode as opposed to a non-demonstration mode (also referred to as a normal mode), the demo region controller 310 is provided the demo frame region coordinates for the image frame region 330, in this example as shown by data 340 from driver 314. The demo region controller 310 selects via control data 320 the configuration data from the configuration register 304 to be used when generating the pixel information for the image frame region 330 and selects the configuration data from a configuration register 306 when the pipeline is generating pixel information for the frame region 332. The control logic 310 controls selection of the configuration data 360 based on screen location coordinates that define a demonstration area, such as image frame region 330, of a display screen. The control logic controls selection of the configuration data 362 from control register 306 in the demonstration mode based on screen location coordinates that define another display area 332 of the display screen.

As such, the demo region controller 310 determines which configuration information to employ based on screen coordinate information corresponding to the location on the screen of a frame region of a frame buffer. In this example, an image frame. In this example, side-by-side demonstration regions (e.g., windows) are employed however any suitable configuration may be employed.

In some implementations the driver stores the screen locations in a register for the demo region controller 310 that defines each frame region. The controller 310 compares a current pixel location that is being rendered by the pipeline to the stored screen locations and if the current pixel is outside the demo frame region 330 then the control data 320 switches to the configuration data that is applied for the other frame region 332. In some implementations the demo region controller 310 is implemented as one or more state machines. For example, the controller 310 runs in real-time and compares each image X & Y coordinate that the image processor handles with the demo region range and the demo mode does not force disabling of any existing features (e.g. overlay window). In other implementations, the controller 310 re-purposes an existing window controller but in this example re-using an overlay window controller means that overlay would have to be disabled in the demo mode. However, any suitable logic may be employed.

Various frame region layouts are contemplated. For example, in some implementations, the control logic provides selection of configuration data to provide frame region layouts based on image coordinates that provide a split screen left and right such as at a middle of the screen or at programmable or moveable dividing line. In other implementations the layout is a split screen top and bottom such as at a middle of the display or at programmable or moveable dividing line. In certain implementations, the control logic creates a demo window that is a single rectangle area within the larger active image frame, such as a fixed size or programmable or moveable window. In some implementation an inverse layout is provided where a smaller rectangle is active setting and the area outside is the demo region and is fixed or adjustable size and location. Other methods may be used, such as a chess board like checker board pattern where white is the active configuration and black is the demo configuration, or multiple horizontal or vertical stripes of intermixed active and demo configurations. All of the above are done using the X & Y pixel coordinates of the image processing pipeline and comparisons to configured demo mode frame region coordinates using, a window controller as known in the art.

As illustrated in FIG. 3, the output from the configuration register 304, which serves as the pending configuration register during non-demonstration operation, is coupled to the multiplexing logic 308 and to the configuration register 306 which serves as an active configuration register during a non-demonstration mode. The output configuration data 362 of the configuration register 306 is provided to the multiplexing logic 308. In non-demonstration mode (i.e., normal operation), the configuration register 306 is controlled by the enable control 370 to operate in a normal double buffering operation meaning that the contents of the pending configuration register, configuration register 304, are passed to the active configuration register, the configuration register 306, between processing of different frames to provide a single image as opposed to a split display image, in normal operation. In one implementation, in normal operation control data 320 is controlling the multiplexor 308 to select control data 362 from the active configuration register 306. The mux 308 does not select control data 360 in the normal mode, only in the demo mode. In the non-demonstration mode the entire image frame is shown to be image frame 332 and frame region 330 does not exist.

The double buffer enable 370 enables or disables the movement of control data from configuration register 304 to 306 between frames. Configuration register 306 is always enabled during the processing of frames, in both demo and normal modes.

In one implementation, the control logic 310 (e.g., the driver) defines the first frame region 330 and the second frame region 332. The control logic 310 controls the multiplexing logic 308 via control data 320, to select the configuration data 360 from the configuration register 304 for generation of an image frame region 330 as a demonstration region. In some implementations, the control logic controls the multiplexing logic 308 to select the configuration data 362 from the configuration register 306 for generation of the frame region 332 so that the generated frame region 330 and 332 are displayed together in an image frame 124 on the display screen using a single or same processing pipeline of the image processor 302.

In a non-demonstration mode, the control logic such as the driver configures the configuration register 304 as a pending configuration register and configures the register 306 as an active configuration register as noted above.

Figure 4:
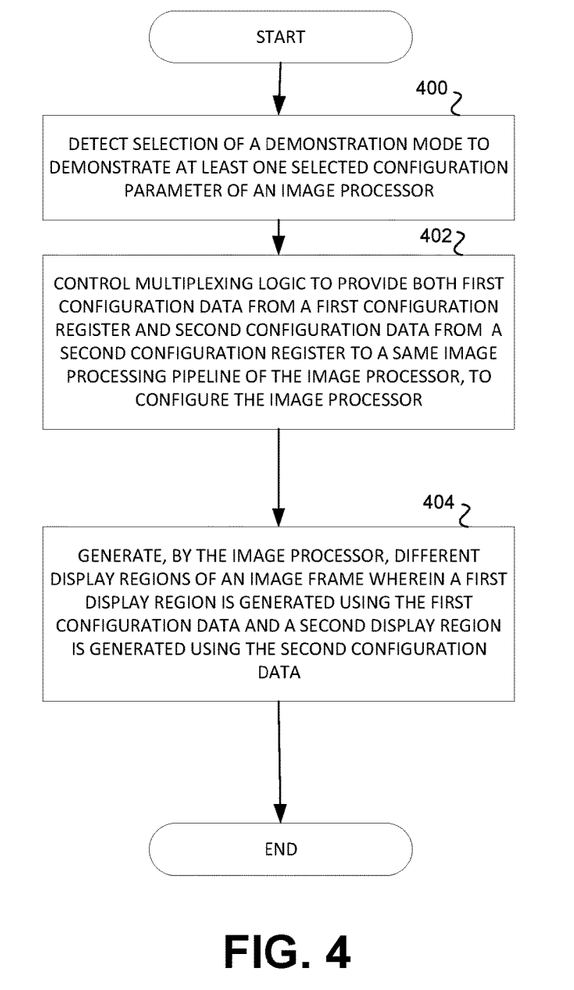
FIG. 4 is a method for generating one or more image frames in accordance with one example set forth in the disclosure.

FIG. 4 is flowchart illustrating an example of a method for generating an image frame that, in one example, is carried out by the apparatus shown in FIG. 3. However, any suitable apparatus may be employed and it will be recognized that the order of operations described may be done in any suitable order. As shown in block 400, the method includes detecting selection of a demonstration mode to demonstrate at least one selected configuration parameter of an image processor. For example, a user through a graphic user interface or other interface can select that the user wishes to operate in a demonstration mode. The driver, for example, is informed of the decision and controls the apparatus 300 to operate in a demonstration mode as opposed to a non-demonstration mode. In the demonstration mode, as shown in block 402, the method includes controlling the multiplexing logic 308 to provide both configuration data 360 from the configuration register 304 and the configuration data 362 from the configuration register 306 to a same image processing pipeline 302 within the image processor to configure the image processor to output the image frame 124 that includes multiple frame regions produced by the same image processing pipeline. As shown in block 404, the method includes generating, by the image processing pipeline 302, different frame regions 330 and 332 of image frame 124 wherein frame region 330 is generated using the configuration data 360 and the frame region 332 is generated using the configuration data 362. As such, the same processing pipeline 302 uses configuration data from multiple different configuration registers for a same image frame 124, unlike prior systems that utilized multiple pipelines, one for each frame region.

In this example, the method includes generating the frame region 330 as a demonstration region based on configuration register 304 and generating the frame region 332 of a same image frame 124 based on the configuration register 306. This is done using the same image processing pipeline 302 of the image processor.

Figures 3, 5:
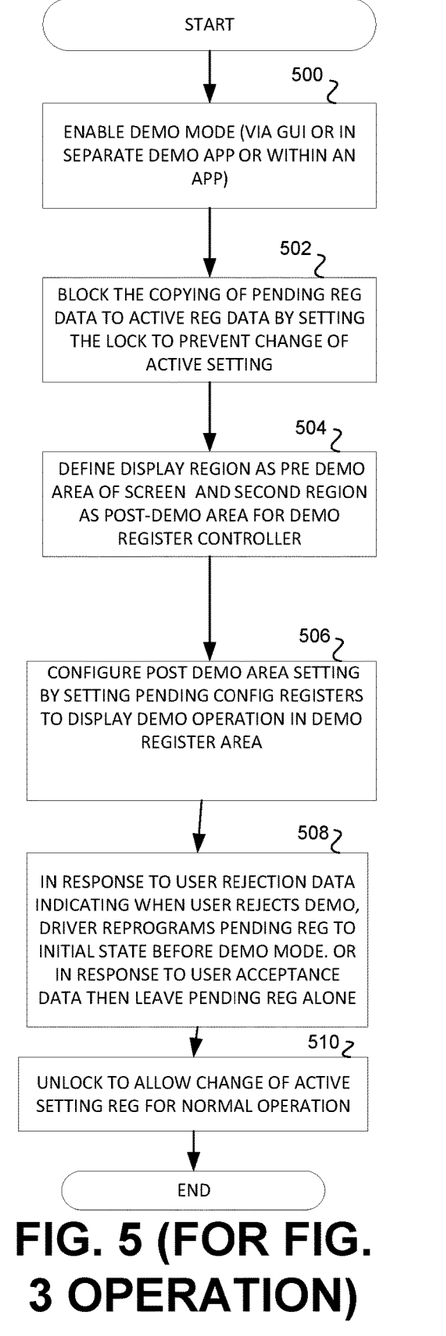
FIG. 5 is a method for generating one or more image frames in accordance with one example set forth in the disclosure.

Referring also to FIG. 5, a flowchart illustrates a method for generating an image frame employing, for example, the apparatus of 300. As shown in block 500, the method includes enabling a demo mode, such as via a graphic user interface (see e.g., FIG. 7) or through another interface such as by launching a separate demonstration application, a demo code segment within an application or launching a demo mode in any other suitable manner. In non-demonstration operation, the configuration register 304 is configured as a pending configuration register and the configuration register 306 is configured as an active configuration register. As such, the configuration register 304 in a non-demonstration mode (e.g., normal operation) is configured to pass the configuration data 360 to the active configuration register shown as configuration register 306 between image frames. However, when a demonstration mode has been activated, control logic, such as a driver, enables the demonstration mode of operation allowing a user to select a demonstration mode such as through a graphic user interface or other suitable mechanism. In response to enabling the demonstration mode, the method includes as shown in block 502, blocking the copying of the pending registration data (configuration data 360) to the active register (configuration register 306), by setting the lock 126 to prevent a change of the active configuration register. This blocking in one example is done by the enable 370 freezing the active configuration register to not receive or be changed by the pending configuration register 304.

As shown in block 504, in response to the enabling of the demonstration mode, the control logic defines the frame region 332 as in one example a pre-demo region of a display screen and a second region 330 as a post-demo region so that the demo region controller 310 is informed of the screen location coordinate that define the demonstration area of the display screen 330 and the other area of the display screen such as a pre-demonstration area in frame region 332. The configuration of the processing pipeline 302 for the frame region 332 is controlled by the configuration data 362 of the configuration register 306 and configuration settings for the same pipeline are controlled by configuration register 304 for the frame region 330. As shown in block 506, the method includes configuring the post-demo region 330 by setting the pending configuration register 304 to display the parameters as configured through the configuration data 360 in the demo region area 330. As shown in block 508, the method includes in response to user rejection data indicating when a user rejects the demonstration settings, reprogramming the register 304 to an initial state that it was at before the demo mode was enabled and undo the lock 126 to place the system in the non-demonstration mode of operation. In response to a user accepting the configuration data as the new data for operation, the method includes undoing the lock 126 to allow normal operation that passes the configuration data in register 304 to the active configuration register 306 in the non-demonstration mode. This is shown for example in block 510.

Figure 6:
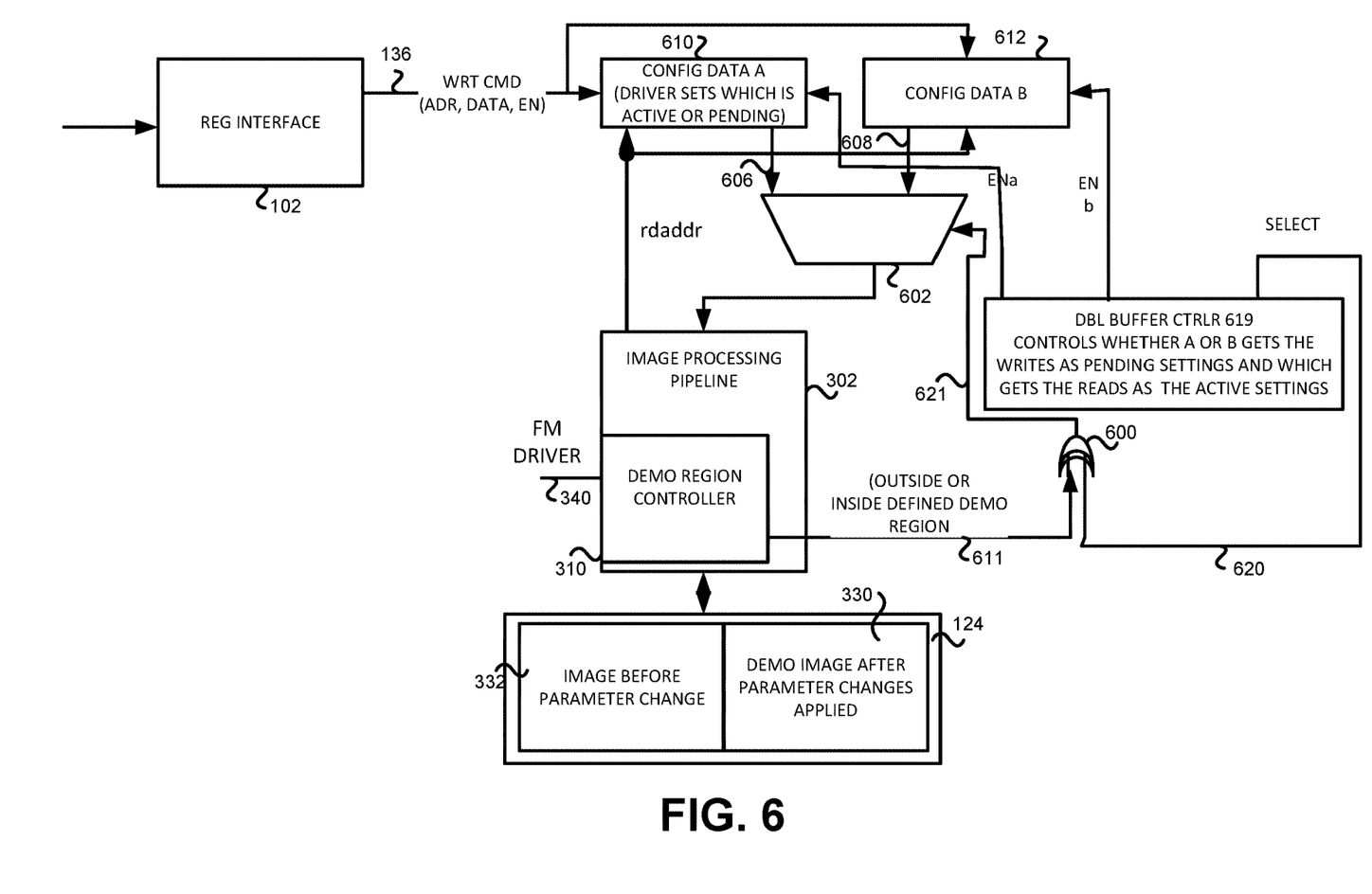
FIG. 6 is a block diagram illustrating one example of an image generation apparatus in accordance with one example set forth in the disclosure.

FIG. 6 is a block diagram illustrating another example of an apparatus for providing an image frame which is an improved design compared, for example, to the prior art structure shown in FIG. 2. In this example, the control logic includes selection logic such as exclusive OR logic 600 that is coupled to a multiplexor 602 that receives configuration data 606 and 608 from each of a configuration register 610 and 612 which in non-demonstration operation either can be selected as the active configuration register. In prior art systems this selection is typically done at frame boundaries, rather than toggled during the active processing of a specific frame. Or in some cases it is toggled within a specific frame, but unlike prior systems, the disclosed control logic controls selection of configuration data based upon the X & Y coordinate that the processing pipeline is currently working on the so the MUX logic 602 is controlled based on image coordinates in the demo mode.

In this example, during the demonstration mode, the multiplexing logic 602 includes the exclusive OR logic 600 that produces select signal 621 to select configuration data 606 in response to demo image region coordinate data 611 which indicates, for example, whether the pixel to be rendered, block to be rendered, or partial scan line to be rendered, is inside or outside the demo region 330. For example, if the area to be generated is within the demo area, a logic one is issued to select the configuration data 606, if it is outside the demo region such as in region 332 to be generated, configuration data 608 is selected via multiplexor 602. The mux selection logic, such as exclusive OR logic 600 also receives select data 620. It will be recognized that any suitable selection logic can be used instead of an XOR configuration including for example a multiplexing circuit. During non-demonstration mode, double buffer controller 619 generates the select data 620 that typically changes at frame boundaries to select configuration registers 610 or 612 for use on the next frame. The double buffer controller 619 issues the read enable A (ENa) or read enable B (ENb) signals to select whether configuration register 610 or 612 is used as the active registers during the non-demonstration mode.

The apparatus uses the single or same image processing pipeline which, in a demo mode, is configured using configuration data from multiple different configuration registers to produce multiple image regions as parts of an image frame. Each configuration register is used to configure the image processing pipeline for a particular portion of the image frame 124, namely image region 330 or 332.

Figure 7:
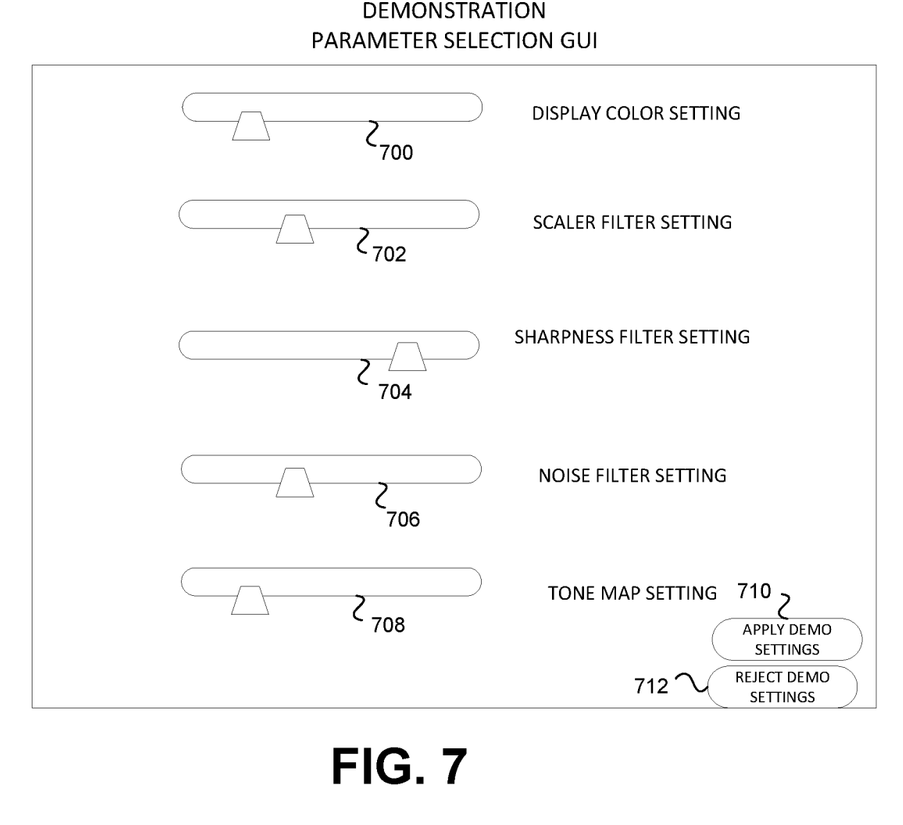
FIG. 7 is a diagram illustrating one example of a graphics user interface for selecting configuration data for configuring a same image processing pipeline of an image processor in accordance with one example set forth in the disclosure.

FIG. 7 illustrates one example of a graphic user interface to provide selection of the differing image processor configuration data in the form of various parameters. In one example, there is selectable data 700 such as a selectable slide bar that allows a user to select a display color setting, selectable data 702 that allows differing scaler filter settings, selectable data 704 that provides selection of different sharpness filter settings such as different filter coefficients as configuration data, selectable data 706 to allow selection of different noise filter settings and selectable data 708 to allow selection of different tone map settings. A user can activate and apply demo settings button 710 to indicate that the demo settings that were selected and image displayed is acceptable for use in non-demonstration operating mode. A reject demo settings button 712 is used to allow a user to select a rejection of the demo settings that were used to generate the demo image 330. It will be recognized that any suitable configuration settings for an image processing pipeline may be allow through a GUI user interface or any other suitable user interface.

It has been discovered that in some implementations, updates of the demo settings may cause image corruption due to changes being applied without double buffering, such as one or two frames may show some corruption due to this, however, the corruption would disappear after updates of the demo mode settings are done and at least one full image frame is processed using the same demo mode settings for all pixels.

Among some technical benefits, the disclosed apparatus and methods use a modified display hardware arrangement (e.g., configuration register linkage and mux control) so that in a demo mode one area of the display is processed by the normally selected configuration (at bat and set A in this example), and the rest of the display area is processed using the on base and other (set B) configuration. This requires the image processing pipeline to shift between the Set A or Set B selections based on screen coordinates for a same image frame. In some implementations, multiplexing logic enables shifting temporarily to the at bat setting for the demo region, and then shifting back to the normal at base setting when outside the demo region.

By way of example, if a demo mode allowed the changing of color settings for the display, scaler filter settings or settings of sharpness filters, noise filters, HDR conversions or tone mapping, the above described operation allows a user to see in a live fashion before and after images when previous settings are applied and the post settings are applied. Both control settings are used with the same image processing pipeline that generates the image frame and the demo frame region allows a user to see the changes as they are occurring. Unlike prior systems, an image frame (the entire frame shown on the image including multiple windows) is produced using configuration data from multiple configuration registers that are used as active and pending registers during a demonstration mode and as configuration registers for different regions of an image frame generated by a same processing pipeline.

The disclosed apparatus and methods result is a solution that works without modification of the operating system (OS) to enable demo modes or to underlying applications such as video players. In some implementations, the differing frame regions of the image frame shows the user "current" and "after" samples for slider settings.

Although features and elements are described above in particular combinations, each feature or element can be used alone without the other features and elements or in various combinations with or without other features and elements. The apparatus described herein in some implementations use software or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An image generation apparatus comprising:
   at least a first configuration register that comprises first configuration data for configuring parameters of an image processor;
   at least a second configuration register that comprises second configuration data for configuring the parameters of the image processor;
   multiplexing logic operatively coupled to the first configuration register and to the second configuration register; and
   control logic, operatively coupled to the multiplexing logic, operative in a first mode to select the at least first configuration register to produce a first image frame for a display and operative in a second mode to control the multiplexing logic to select both the at least first and the at least second configuration registers for a same image processing pipeline of the image processor that generates different image processing options in frame regions that are displayed together in an image frame on the display.

2. The apparatus of claim 1 comprising the image processor and wherein the image processor is operative to:
   generate a first frame region of the image frame as a demonstration region based on the first configuration register; and
   generate a second frame region of the same image frame, using the same processing pipeline, as a second region based on the second configuration register,
   wherein the first frame region comprises pixel data that demonstrates different display parameter settings of the image processor compared to the second frame region of the image frame that is based on the second configuration register.

3. The apparatus of claim 2 wherein the control logic is operative to:
define the first frame region of the image frame and define a different second frame region of the image frame by differing screen location coordinates;
control the multiplexing logic to select the first configuration data from the first configuration register for generation of the first frame region as a demonstration region; and
control the multiplexing logic to select the second configuration data from the second configuration register for generation of the second frame region so that the generated first frame region and the generated second frame region are displayed together in an image frame.

4. The apparatus of claim 1 wherein the control logic is operative to configure the first configuration register as a pending configuration register for a next image frame to be displayed during the first mode and to configure the second configuration register as an active configuration register for a current image frame to be displayed during the first mode.

5. The apparatus of claim 1 wherein the control logic is operative to control selection of the first configuration data based on screen location coordinates that define a demonstration area of a display screen.

6. The apparatus of claim 5 wherein the multiplexing logic comprises exclusive OR logic operatively coupled to select the first configuration data in response to demo image region coordinate data.

7. The apparatus of claim 1 wherein the t east first configuration register is configured to pass the first configuration data to the second configuration register between image frames during a non-demonstration mode; and
wherein the control logic is operative to:
enable a demonstration mode of operation;
in response to enabling the demonstration mode, set a lock to block copying of first configuration data to the second configuration register;
define a post-demonstration frame region as a first frame region of the image frame and define a pre-demo frame region as a second frame region of the image frame;
configure the post-demonstration frame region by setting the first configuration register to produce a demonstration image in the post-demonstration frame region;
in response to user rejection data indicating when a user rejects demonstration settings, reprogram the at least first configuration register to an initial state before the demonstration mode was enabled and release the lock; and
in response to user acceptance data indicating when the user accepts demonstration settings, undo the lock to allow non-demonstration mode operation that passes first configuration register contents to the second configuration register.

8. An image generation apparatus comprising:
a display operative to display one or more image frames;
an image processor operatively coupled to the display;
at least a first configuration register that comprises first configuration data for configuring parameters for a processing pipeline of the image processor;
at least a second configuration register that comprises second configuration data for configuring the parameters of the processing pipeline of image processor;
multiplexing logic operatively coupled to the first configuration register and to the second configuration register;
control logic, operatively coupled to the multiplexing logic, operative in a first mode to select the at least first configuration register to produce a first image frame and operative in a second mode to control the multiplexing logic to select both the at least first configuration register and the at least second configuration registers for the processing pipeline of the image processor; and
the image processor operative to generate different image processing options in frame regions, that are displayed together in an image frame on the display based on the both the first and second configuration data.

9. The apparatus of claim 8 wherein the image processor is operative to:
generate a first frame region of the image frame as a demonstration region based on the first configuration register; and
generate a second frame region of the image frame as a second frame region based on the second configuration register,
wherein the first frame region comprises pixel data that demonstrates different display parameter settings of the image processor compared to the second frame region of the image frame that is based on the second configuration register.

10. The apparatus of claim 9 wherein the control logic is operative to:
define the first frame region of the image frame and define a different second frame region of the image frame by differing screen location coordinates;
control the multiplexing logic to select the first configuration data from the first configuration register for generation of the first frame region as a demonstration frame region; and
control the multiplexing logic to select the second configuration data from the second configuration register for generation of the second frame region so that the generated first frame region and the generated second frame region are displayed together in an image frame on the display.

11. The apparatus of claim 8 wherein the control logic is operative to configure the first configuration register as a pending configuration register for a next image frame to be displayed during a non-demonstration mode and to configure the second configuration register as an active configuration register for a current image frame to be displayed during the non-demonstration mode.

12. The apparatus of claim 8 wherein the control logic is operative to control selection of the first configuration data based on screen location coordinates that define a demonstration area of a display screen.

13. The apparatus of claim 12 wherein the multiplexing logic comprises exclusive OR logic operatively coupled to the select the first configuration data in response to demonstration image region coordinate data.

14. The apparatus of claim 11 wherein the pending configuration register is configured to pass the first configuration data to the active configuration register between image frames during the non-demonstration mode; and
wherein the control logic is operative to:
enable a demonstration mode of operation;
in response to enabling the demonstration mode, set lock to block copying of first configuration data to the active configuration register;

define a post-demonstration frame region as a first frame region of the image frame and define a pre-demonstration frame region as a second frame region;
configure the post-demonstration frame region by setting the pending configuration register to produce a image in the post-demonstration frame region;
in response to user rejection data indicating when a user rejects demonstration settings, reprogram pending register to initial state before demonstration mode enabled; and
in response to acceptance data indicating when the user accepts demonstration settings, release the lock to allow non-demonstration mode operation that passes pending configuration register contents to the active configuration register.

15. A method for providing an image frame comprising:
detecting selection of a demonstration mode to demonstrate at least one selected configuration parameter of an image processor;
controlling multiplexing logic to in a non-demonstration mode select first configuration register to produce a first image frame for a display and in a demonstration mode to select both first configuration data from at least a first configuration register and second configuration data from at least a second configuration register to a same image processing pipeline of the image processor, to configure the image processor; and
generating, by the image processor, different image processing options in frame regions that are displayed together in an image frame wherein a first frame region is generated using the first configuration data and a second frame region is generated using the second configuration data.

16. The method of claim 15 comprising:
generating the first frame region of the image frame as a demonstration region based on the first configuration register; and
generating the second frame region of the same image frame as the second frame region based on the second configuration register,
wherein the first frame region comprises pixel data that demonstrates different display parameter settings of the image processor compared to the second frame region of the image frame that is based on the second configuration register.

17. The method of claim 16 comprising:
defining the first frame region of the image frame and define a different second frame region of the image frame;
controlling the multiplexing logic to select the first configuration data from the first configuration register for generation of the first frame region as a demonstration image region; and
controlling the multiplexing logic to select the second configuration data from the second configuration register for generation of the second frame region so that the generated first frame region and the generated second frame region are displayed together in the image frame on a display screen using the same processing pipeline.

18. The method of claim 15 comprising controlling selection of the first configuration data based on screen location coordinates that define a demonstration area of the display.

19. The method of claim 18 comprising using exclusive OR logic to select the first configuration data in response to demonstration image region coordinate data.

20. The method of claim 15 comprising:
in response to a non-demonstration mode, configuring the first configuration register as a pending configuration register and the second configuration register as an active configuration register;
passing the first configuration data to the second configuration register between image frames during the non-demonstration mode;
enabling a demonstration mode of operation;
in response to enabling the demonstration mode, setting a lock to block copying of first configuration data to the second configuration register;
defining a post-demonstration frame region as the first frame region of the image frame and defining a pre-demonstration frame region as the second frame region of the image frame;
configuring the post-demonstration frame region by setting the first configuration register to produce a demonstration image in the post-demonstration frame region;
in response to user rejection data indicating when a user rejects demonstration settings, reprogramming the first configuration register to an initial state before the demonstration mode was enabled and release the lock; and
in response to user acceptance data indicating when the user accepts demonstration settings, undoing the lock to allow non-demonstration mode operation that passes first configuration register contents to the second configuration register.

* * * * *